US009087233B2

(12) United States Patent
Heringslack

(10) Patent No.: US 9,087,233 B2
(45) Date of Patent: Jul. 21, 2015

(54) SECURITY BY Z-FACE DETECTION

(71) Applicant: Sony Mobile Communications AB, Lund (SE)

(72) Inventor: Henrik Heringslack, Lomma (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 101 days.

(21) Appl. No.: 13/900,609

(22) Filed: May 23, 2013

(65) Prior Publication Data

US 2013/0322708 A1 Dec. 5, 2013

Related U.S. Application Data

(60) Provisional application No. 61/655,014, filed on Jun. 4, 2012.

(30) Foreign Application Priority Data

Jun. 4, 2012 (EP) .................... 12182773

(51) Int. Cl.
*G06K 9/00* (2006.01)
(52) U.S. Cl.
CPC ........ *G06K 9/00288* (2013.01); *G06K 9/00221* (2013.01); *G06K 9/00268* (2013.01); *G06K 9/00281* (2013.01)
(58) Field of Classification Search
None
See application file for complete search history.

(56) References Cited

U.S. PATENT DOCUMENTS

| 2010/0194860 | A1* | 8/2010 | Mentz et al. | 348/47 |
| 2012/0293635 | A1* | 11/2012 | Sharma et al. | 348/50 |
| 2013/0015946 | A1* | 1/2013 | Lau et al. | 340/5.2 |
| 2013/0101182 | A1* | 4/2013 | Frischholz et al. | 382/118 |
| 2013/0286161 | A1* | 10/2013 | Lv et al. | 348/46 |

OTHER PUBLICATIONS

Jahanbin, Sina, et al., "Passive Multimodal 2-D+3-D Face Recognition Using Gabor Features and Landmark Distances", IEEE Transactions on Information Forensics and Security, Dec. 2011, vol. 6, No. 4, pp. 1287-1304.
Gupta, Shalini et al., "Anthropometric 3D Face Recognition", International Journal of Computer Vision, Kluwer Academic, Publishers, Jun. 2010, vol. 90, No. 3, pp. 331-349.
Kakadiaris, I.A., "Chapter 17: Face Recognition Using 3D Images", Handbook of Face Recognition, Jan. 2011, pp. 429-459.

* cited by examiner

*Primary Examiner* — Aaron W Carter
*Assistant Examiner* — Narek Zohrabyan
(74) *Attorney, Agent, or Firm* — Renner, Otto, Boisselle & Sklar, LLP.

(57) ABSTRACT

A method for identifying a person using a mobile communication device, having a camera unit adapted for recording three-dimensional (3D) images, by recording a 3D image of the person's face using the camera unit, performing face recognition on the 2D image data in the recorded 3D image to determine at least two facial points on the 3D image the of person's face, determining a first distance between the at least two facial points in the 2D image data, determining a second distance between the at least two facial points using the depth data of the recorded 3D image, determining a third distance between the at least two facial points using the first distance and the second distance, and identifying the person by comparing the determined third distance to stored distances in a database, wherein each of the stored distances are associated with a person.

9 Claims, 4 Drawing Sheets

SECURITY BY Z-FACE DETECTION

CROSS-REFERENCE TO RELATED APPLICATION

This application claims the benefit of U.S. Provisional Patent Application Ser. No. 61/655,014, filed Jun. 4, 2012, the entire disclosure of which is hereby incorporated by reference.

TECHNICAL FIELD

The present invention relates to the field of security systems for mobile communication devices and, in particular, to a security system for mobile communication devices based on face recognition using three-dimensional images.

BACKGROUND

More and more personal and sensitive business information is today being stored on modern mobile communication devices such as mobile phones and tablet computers. The mobile communication device is today also being used for making financial transactions such as paying for commodities and buying stocks. Securing the mobile communication device from being accessed by unauthorised persons is thus very important.

The most common way of securing the information in the mobile communication device is by protecting the access to the device by a personal identification number (PIN). There also exist other type of access methods such as using the user's voice (i.e. by voice recognition), having the user drawing different shapes on a touch sensitive display, using a fingerprint sensor to read the unique fingerprint of the user. One of the more secure ways of identifying a user is by face recognition using a built-in camera in the mobile communication device. However, face recognition in mobile communication devices is today not reliable enough, do not provide an adequate level of security and/or consumes much computational power making it a very slow and power hungry way of providing security. Thus, finding a way to improve the security system of a mobile communication device is therefore highly sought for.

SUMMARY OF THE INVENTION

With the above description in mind, then, an aspect of the present invention is to provide a way to improve the security system in mobile communication devices which seeks to mitigate, alleviate, or eliminate one or more of the above-identified deficiencies in the art and disadvantages singly or in any combination.

A first aspect of the present invention relates to a method for identifying a person using a mobile communication device having a camera unit adapted for recording a three-dimensional (3D) image, wherein said recorded 3D image comprises two-dimensional (2D) image data and depth data, said method comprises the steps; recording a 3D image of said person's face using said camera unit, performing face recognition on the 2D image data in said recorded 3D image to determine at least two facial points on said 3D image of said person's face, determining a first distance between said at least two facial points in said 2D image data, determining a second distance between said at least two facial points using said depth data of said recorded 3D image, determining a third distance between said at least two facial points using said first distance and said second distance and identifying said person by comparing said determined third distance to stored distances in a database, wherein each of said stored distances are associated with a person.

The method wherein said determining of said second distance between said at least two facial points may further comprise determining the absolute difference of the depth distance of said at least two facial points.

The method wherein said determining of third distance between said at least two facial points may further comprise calculating the third distance using Pythagoras' theorem wherein said first distance is one side and said second distance is another side in the Pythagorean equation, and the third distance is the hypotenuse.

The method wherein said determined at least two facial points may be predetermined at least two facial points or may be user defined at least two facial points.

The method wherein said identifying of said person may further be based on said face recognition of the 2D image, wherein said face recognition is compared to stored face recognition data in said database, wherein each of said stored face recognition data are associated with a person.

The method wherein said at least two facial points may be any of the group: nose, left ear, right ear, left eye, right eye, the top of the head, the left cheek bone, the right cheek bone, the chin, the left corner of the mouth, the right corner of the mouth, the left eye brow or the right eye brow.

A second aspect of the present invention relates to a mobile communication device for identifying a person, said mobile communication device having a camera unit adapted for recording a three-dimensional (3D) image of said person's face, wherein said recorded 3D image comprises two-dimensional (2D) image data and depth data, said mobile communication device further comprises; a processing unit for performing face recognition on the 2D image data in said recorded 3D image and further adapted to determine at least two facial points on said 3D image of said person's face, said processing unit is further adapted to determining a first distance between said at least two facial points in said 2D image data, determining a second distance between said at least two facial points using said depth data of said recorded 3D image, and to determining a third distance between said at least two facial points using said first distance and said second distance, a memory unit storing a database of third distances, wherein each of said stored distances are associated with a person, and wherein said processing unit is further adapted to identifying said person by comparing said determined third distance to said stored distances in said database.

The mobile communication device wherein said processing unit may further be adapted to, in the determining of said second distance between said at least two facial points, determining the absolute difference of the depth distance of said at least two facial points.

The mobile communication device wherein said processing unit may further be adapted to, in the determining of said third distance between said at least two facial points, calculating the third distance using Pythagoras' theorem wherein said first distance is one side and said second distance is another side in the Pythagorean equation, and the third distance is the hypotenuse.

The mobile communication device wherein said processing unit may further be adapted to base the identifying of said person on said face recognition of the 2D image, wherein said face recognition is compared to stored face recognition data in said database in said memory unit, wherein each of said stored face recognition data are associated with a person.

Any of the variants presented under respective aspect above, may be combined in any possible way in order to create different embodiments of the present invention.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The present invention and embodiments thereof will be described using a mobile phone, shown in FIG. 1, as an example. However, the present invention is not in any way limited to be used only with mobile phones, but may be realised using any type of mobile communication device such as tablet computers (a.k.a. pads), laptops, organizers, handheld electronic devices, etc.

Figure 1:
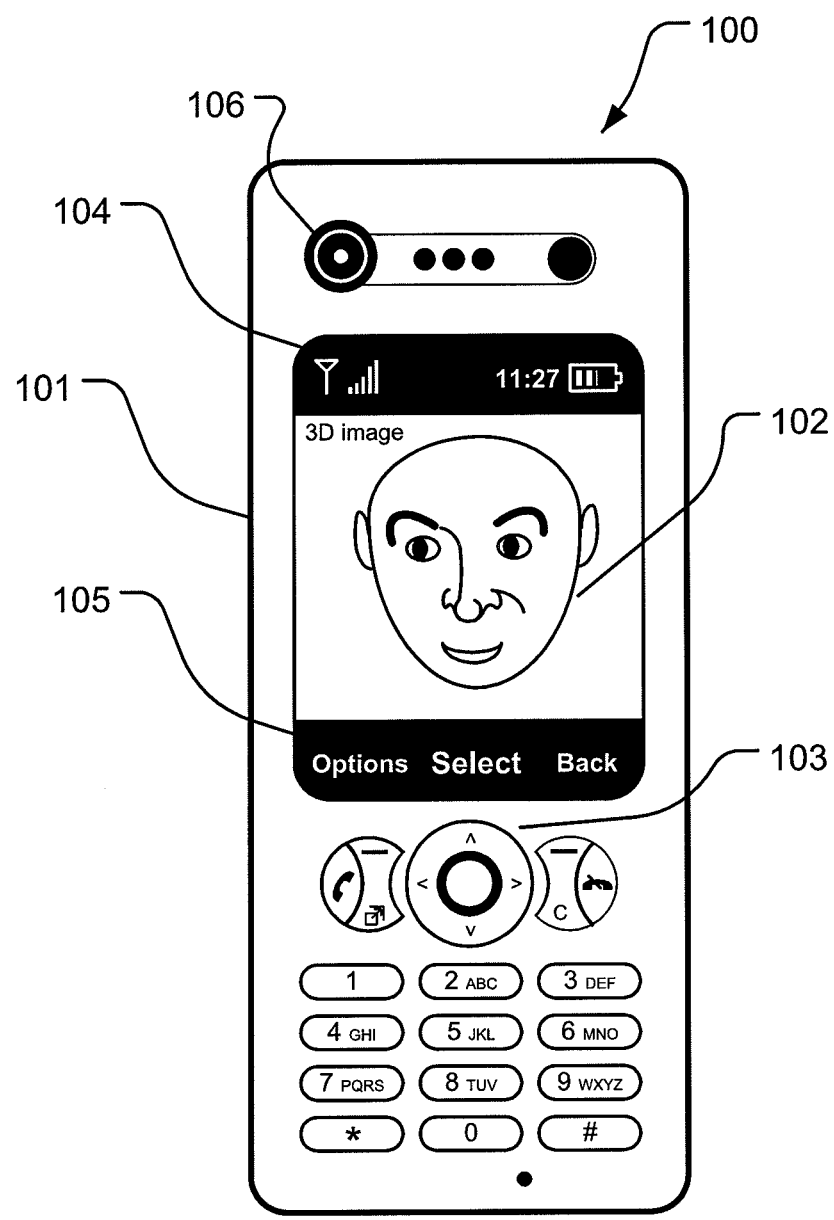
FIG. 1 shows a mobile phone having at least one integrated camera capable of recording 3-dimensional images, according to an embodiment of the present invention.

The mobile phone 100 in FIG. 1 comprises a casing 101, a display area 102 (showing a recorded 3-dimensional image of the user operating the mobile phone), and means 103 for navigating among items (not shown) displayed in the display area. The display area 102 may comprise different graphical items such as a status indication area 104 and one or more soft key bars 105. The navigation means 103 can be a set of buttons, a rotating input, a joystick, a touch pad, a multidirectional button, but can also be implemented using a touch sensitive display, wherein the displayed items directly can be tapped by a user for selection, or be voice activated via a headset or a built-in microphone. The mobile phone 100 may also comprise other parts such as a speaker, a microphone, a photo sensor (e.g. ambient light sensor), a infrared light (IR) sensor, infrared light emitting diode (IR LED), processing unit (not shown), memory unit (not shown), one or more accelerometers (not shown), a vibration device (not shown), an AM/FM radio transmitter and receiver (not shown), a digital audio broadcast transmitter and receiver (not shown), a BLUETOOTH® wireless device (not shown), an antenna module (not shown), etc. Many of today's mobile phones also have the capability of recording 3-dimensional (hereinafter referred to as 3D) images using one (for instance an array camera) or more integrated cameras 106 positioned either, or both, on the front casing (facing the user) of the mobile phone 100 or on the back casing (facing away from the user) of the mobile phone 100.

As discussed above, face recognition technology may be used for determining the identity of a person by, for instance, identifying a person's face from a recorded image or a video frame. Facial recognition algorithms can be divided into two main approaches, the geometric approach, which looks at distinguishing features, or the photometric approach, which is a statistical approach that distils an image into values and comparing the values with templates to eliminate variances. For example, a facial recognition algorithm may analyze the relative position, size, and/or shape of the eyes and nose, cheekbones, and jaw of the subject's face. These features are then used to search for other images with matching features. Either of the techniques may be used and combined with the present invention described below.

Face recognition may also be used with 3D images. A 3D facial recognition algorithm usually compute a 3D 'topographic map' of the surface shape of a face from the recorded 3D image data. The topographic information is then used for identifying distinctive features of the surface of the face, such as the contour of the eye sockets, nose, and chin. The topographic information of the recorded face vastly improves the precision of the facial recognition.

However, face recognition technology does not function flawlessly and it struggles to perform under certain conditions such as: poor lighting, when the subject's face is turned or tilted away from a full frontal position, when the subject is wearing accessories such as sunglasses, the subject having long hair laying across the face, or when the image resolution of the subject's face is poor. Facial recognition technology is also sensitive to variations in facial expression and in some cases it can be fooled using an ordinary photograph. 3D face recognition technology is not as sensitive to if the subject's face is tilted or turned from a full frontal position or to different light conditions. However, it is still sensitive to, for example, variation in facial expressions. Another drawback with a 3D face recognition technology is that it is very computational heavy consuming lots of battery power which makes it unsuitable for usage in mobile communication device. All above mentioned drawbacks will consequently affect the security, reliability and the usability of the face recognition technology as a primary security measure for mobile communication devices such as mobile phones.

The quality of today's 3D cameras 106 integrated into mobile communication devices 100 makes it possible to record 3D images with high resolution. From a high resolution 3D image it is then possible to make a very detailed depth map or a topographic map of the object(s) in the image, especially objects within a few meters of the 3D camera 106.

A recorded 3D image contains both ordinary 2-dimensional image data (hereinafter referred to as 2D image data) as well as 3D image data. The separation, or distance, between objects in the recorded image can be determined both from the 2D image data, in an x- and y-direction (if defined in a coordinate system), as well as from the 3D image data, in an x-, y- and z-direction, utilizing the depth information (the z-direction) in the 3D image according to an embodiment of the present invention. For example, if a 3D image of a human face is recorded by a mobile communication device 100 having, for instance, an integrated array camera 106 (for recording 3D images), it would be possible to not only determine the distance between the nose and one eye of the face from the 2D image data (i.e. a measurement between two objects in an x- or the x- and y-direction in the image), but it would also be possible to determine the relative depth between the nose and the eye of the face (i.e. a measurement between two objects in the z-direction in the image).

One way of enhancing the security, reliability and the usability of face recognition technology in mobile communication devices is, according to an embodiment of the present invention, to combine 2D facial recognition technology with reduced depth information (meaning without the need to calculate a whole topographic map of the person's face) using recorded 3D image data. This will reduce the amount of computational power needed and thus reduce the power consumption. It will also be faster since not a whole topographical map needs to be calculated, and it is also more robust since it is not as sensitive to changes in facial expression or the tilting of the face, etc.

The present invention may be implemented using a mobile phone 100, as shown in FIG. 1, having a camera unit 106 adapted for recording 3D images. In a security application running in said mobile phone, the user of the mobile phone aims the camera unit at his or hers face and record a 3D image of the face.

Figure 2:
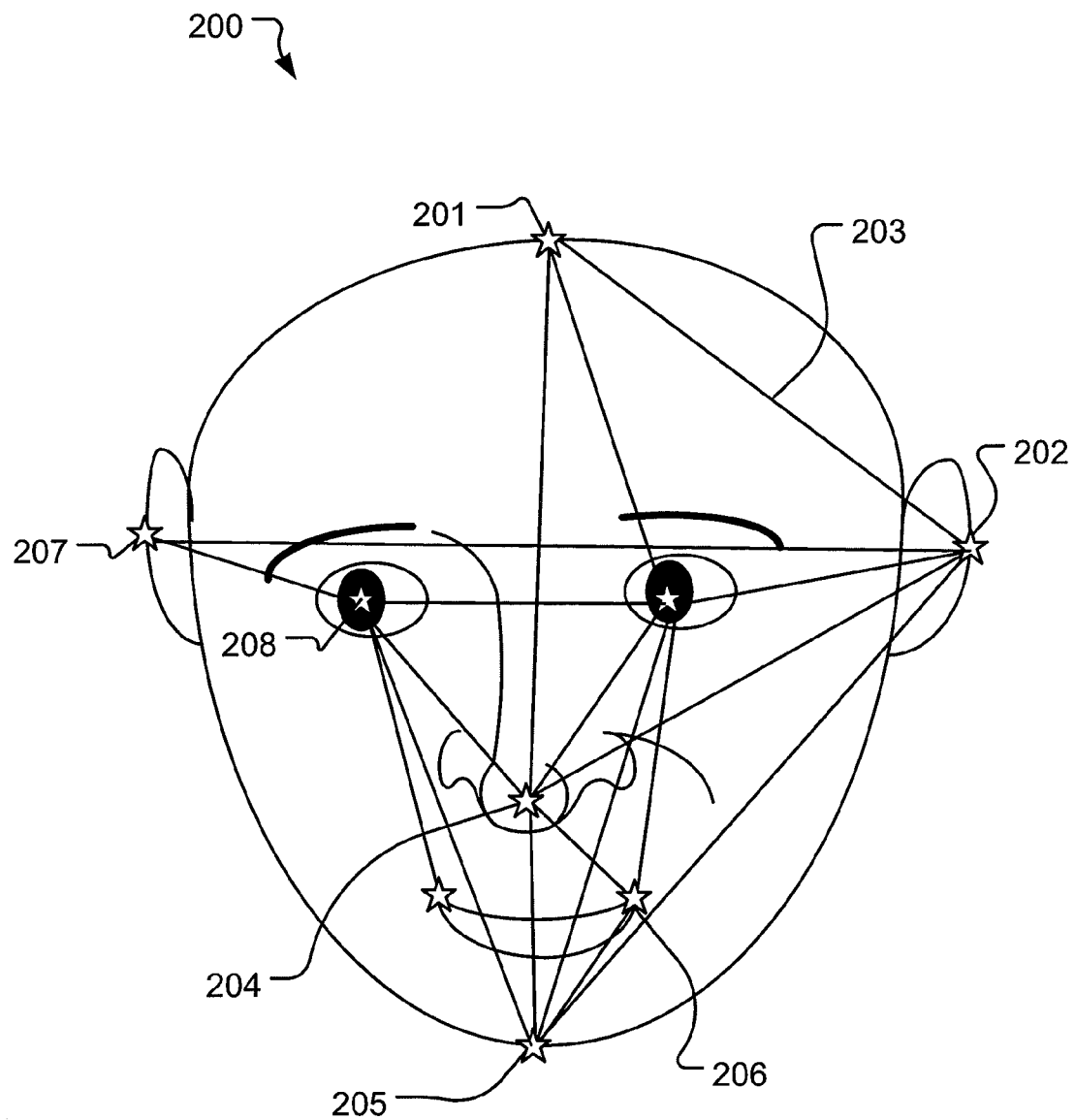
FIG. 2 shows a recorded 3-dimensional image of a human face wherein distances between different features in the face may be measured in three dimensions, according to an embodiment of the present invention.

The 3D images contain both 3D image data and 2D image data, wherein the 2D image data is a subset of the 3D image data. FIG. 2 illustrates a recorded 3D image of a user's face 200. The 3D image data, containing, as discussed above, both 2D image data and depth data (z-direction), is stored in a memory in said mobile phone 100.

According to the present invention, at least two facial points (examples of such facial points are indicated by stars in FIG. 2) on the recorded 3D face 200 in FIG. 2 are identified, or more correctly are identified from the 2D image data in the recorded 3D image data using any well-known facial recognition method in the art. The at least two facial points may be predetermined or factory preset or may be user defined in the mobile communication device. The at least two facial points may for instance be the tip of the highest point of the head 201 (in the y-direction), the furthest tip of the left 202 or right 207 ear (in the x-direction), the nose 204, the lowest tip of the chin 205 (in the y-direction), the left or right corner of the mouth 206 (in the x-direction), the left or right pupil of eyes 208, as marked with stars in FIG. 2. Other facial points such as the left and right cheek bones and the left and right eye brow not indicated or shown in FIG. 2 may also be determined.

The different facial points have different relative z-depths in the 3D image data. When at least two facial points have been identified in the 3D image data representing the face 200, the 3D distance(s) 203 (marked by lines between the stars in FIG. 2), in either three dimensions or in two dimensions together with the relative depth, between the at least two facial points are determined. The 3D distance between two facial points in a 3D image may for example be determined using parallax calculation or Pythagoras' theorem. The Pythagoras' theorem is a relation in Euclidean geometry among three sides of a right-angled triangle. The theorem can be written as an equation relating the lengths of the sides a, b and c of the triangle. The equation is called the Pythagorean equation and can be written as $a^2+b^2=c^2$ where c represents the length of the hypotenuse, and a and b represent the lengths of the other two sides.

Figure 3:
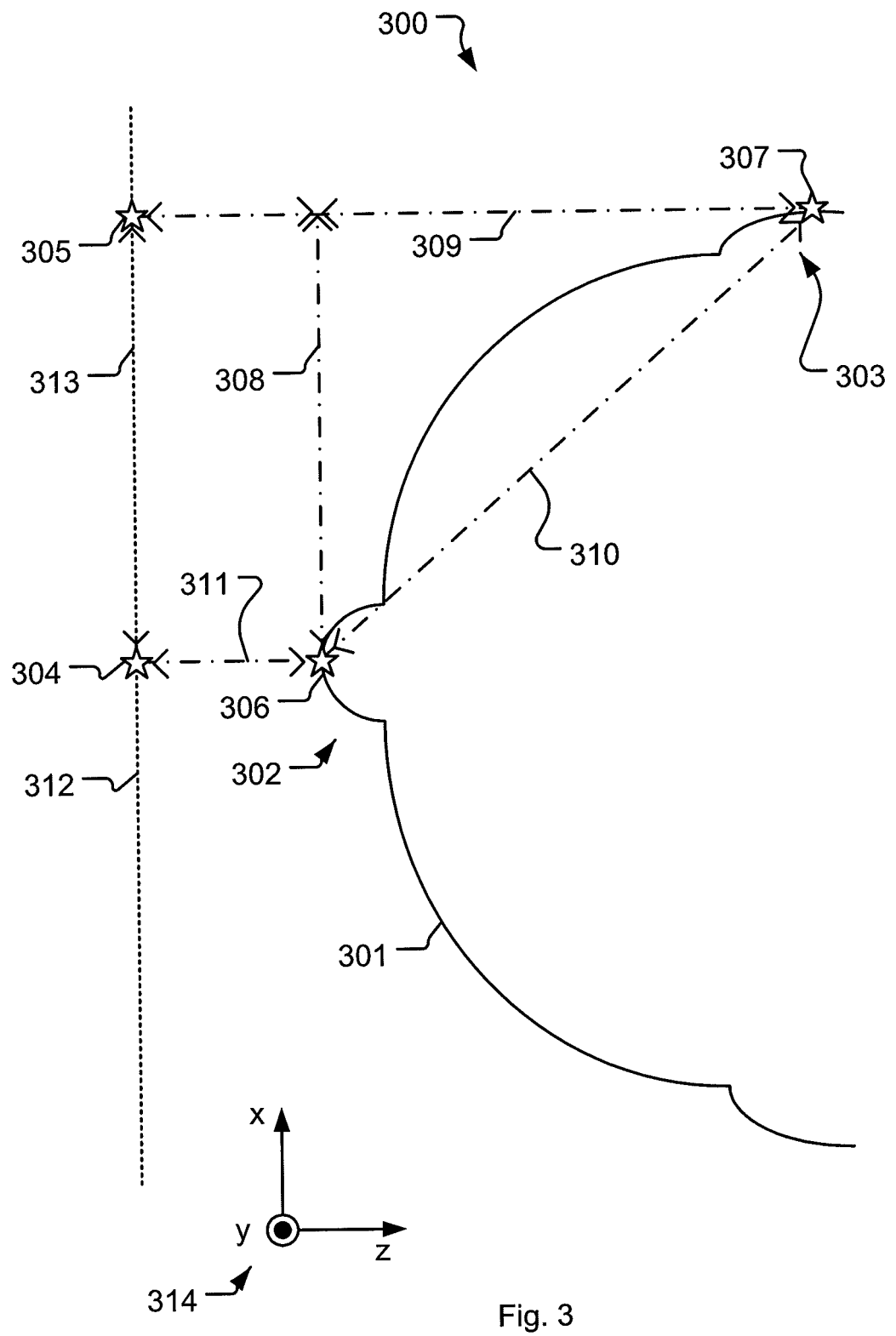
FIG. 3 illustrates how different distances between features of the face in the three dimensional image may be determined.

FIG. 3 shows an example of how distances using reduced depth information as described above may be used to determine distances between features such as a nose and an ear in a recorded three dimensional image of a face 300, according to an embodiment of the present invention. In the example in FIG. 3 the distance between the nose 302 and an ear 303 as shown by the contour of the recorded face 301 is to be determined. The jagged line 312 illustrating the boundary of the 2D perspective or the 2D image data (the image spanned in the x- and y-direction 314 which from hereinafter is referred to as the 2D boundary) of the 3D image. The contour of the face 301,302,303 is then situated at a distance 311,309 (i.e. the depth of the image) from the 2D boundary 312 in the z-direction which is determined by the depth information in the 3D image data.

The first step of a method for identifying a person using a mobile communication device is to determine the position, in the 2D image data, of the nose 302 and the ear of interest 303. This can easily and quite fast be determined by a mobile communication device with limited computational power using any type of face recognition algorithm known in the art. The facial recognition will give us two positions within the 2D image data 304,305 (marked with stars) which represents the positions of the nose 302 and the ear 303 in the 2D image 312 of the recorded face 300. The 2D distance 313 between the nose 304 and the ear 305 can thus be determined.

In the next step the depth information (the z-direction 314) of the ear 303 and the nose 302 from the 2D boundary 312 is used to determine the depth difference between the ear 303 and the nose 302 in the 3D image. The corresponding positions of the nose 304 and the ear 305 of the 2D image in the 3D image is indicated in FIG. 3 by the stars positioned on the nose 306 and the ear 307 of the contour of the recorded face 301. By extracting the depth information from the 2D boundary to the nose 306 and to the ear 307, respectively, the actual depth distance 309 or the absolute depth distance 309 (i.e. the absolute value of the depth distance) between the nose 306 and the ear 307 in the 3D image may be determined. Since the 2D distance 313 between the nose 304 and the ear 305 is previously known, and is equal to the distance 308. it is easy to derive the actual distance 310 between the nose 306 and the ear 307 by using trigonometry such as Pythagoras theorem. One or more 3D distances between different features in the recorded 3D image of the face may be determined in the same way as described in relation to FIG. 3 and shown in FIG. 2.

The determined 3D distance(s) 203 between the at least two facial points is then used to determine the identity of the person in question. In an embodiment of the present invention the determined 3D distance(s) 203 may be compared to 3D distance(s) stored in a data base. Basing the determination of a person's identity on 3D distance(s) is more secure and reliable than doing basic facial recognition since the technique is not as sensitive to changes in appearances (i.e. changes in hair or wearing sunglasses), the lighting condition or the tilt of the face. Also, determining distance(s) 203 between the at least two facial points requires much less computational power than performing an ordinary 3D facial recognition which calculates a topographic mesh structure of the recorded face.

In another embodiment the determined 3D distance(s) 203 between the at least two facial points is used together with an ordinary face recognition algorithm performed on the 2D image data of the recorded 3D image data. When a possible candidate face(s) has been found by the facial recognition algorithm the determined 3D distance(s) may be compared to stored distance(s) associated with the candidate face(s) in the facial recognition database. In this way the facial recognition with the added distance(s) comparison(s) increases the security and the reliability of the identification process considerably in comparison to just ordinary facial recognition. Also, determining a persons identity from facial recognition and distance(s) 203 between the at least two facial points requires much less computational power than performing an ordinary 3D facial recognition, thus the method is much more suitable for mobile phones that performing 3D facial recognition or 2D facial recognition alone.

In a variant to the two embodiments described above the facial recognition may be performed simultaneously on two or more persons depending on how many persons are in the recorded 3D image. In a variant the face of one person may be recorded by a camera unit situated on the back of a mobile phone while another face of a person (usually the user handling the mobile phone) may be recorded by a camera unit situated on the front of the mobile phone (i.e. the same side as the display on the mobile phone). In this way two persons may be identified simultaneously.

The recorded 3D image or 3D images may be stored in a memory unit in the mobile phone. The determination of at least two facial points 201,202, the calculations of distance(s) 203 and/or the 2D facial recognition are performed by a processing means such as a signal processor and/or a central processing unit operating on the recorded 3D image data stored in the memory unit. The extracted and determined information from the determination of at least two facial points 201,202, the calculations of distance(s) 203 and/or the 2D facial recognition are compared to stored information in a database located either in the mobile phone or in a database accessed by the mobile phone via wired or wireless communication. The result of the identification process is shown to the user on a display on the mobile phone.

Figure 4:
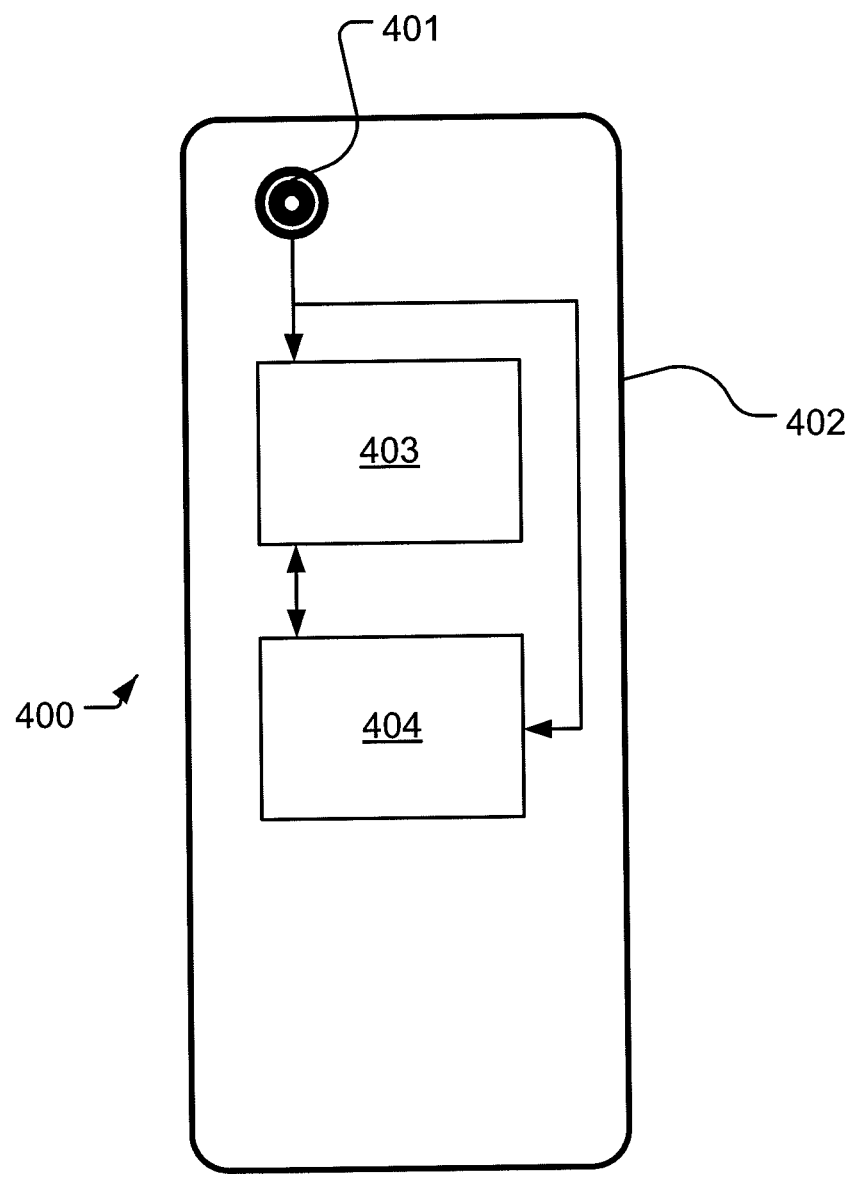
FIG. 4 shows a block diagram of the units in the mobile communication device which are adapted to perform embodiments of the present invention.

FIG. 4 shows a block diagram of a mobile communication device 400 for identifying a person. The mobile communication device 402 having a camera unit 401 adapted for recording a three-dimensional (3D) image of a said person's face, wherein said recorded 3D image comprises two-dimensional (2D) image data and depth data. The camera unit 401 in the communication device 402 is connected to a processing unit 403 which is adapted for performing face recognition on the 2D image data in said recorded 3D image. The processing unit 403 is further adapted to determine at least two facial points on said 3D image said of person's face by determining a first distance between said at least two facial points in said 2D image data; determining a second distance between said at least two facial points using said depth data of said recorded 3D image, and to determining a third distance between said at least two facial points using said first distance and said second distance. The mobile communication device 402 also comprise a memory unit 404 adapted for storing a database of third distances, wherein each of said stored distances are associated with a person. The memory unit is connected to said camera unit 401 and said processing unit 403. The processing unit is further adapted to identifying said person by comparing said determined third distance to said stored distances in said database in said memory unit 404.

The processing unit 403 may further be adapted to, in the determining of said second distance between said at least two facial points, determining the absolute difference of the depth distance of said at least two facial points.

The processing unit 403 may further be adapted to, in the determining of said third distance between said at least two facial points, calculating the third distance using Pythagoras' theorem wherein said first distance is one side and said second distance is another side in the Pythagorean equation, and the third distance is the hypotenuse.

The processing unit 403 may further be adapted to base the identifying of said person on said face recognition of the 2D image, wherein said face recognition is compared to stored face recognition data in said database in said memory unit 404, wherein each of said stored face recognition data are associated with a person.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for identifying a person using a mobile communication device having a camera unit adapted for recording a three-dimensional (3D) image, wherein said recorded 3D image comprises two-dimensional (2D) image data and depth data, said method comprises the steps:

recording a 3D image of said person's face using said camera unit;

performing face recognition on the 2D image data in said recorded 3D image to determine at least two facial points on said 3D image of said person's face;

determining a first distance between said at least two facial points in said 2D image data;

determining a second distance between said at least two facial points using said depth data of said recorded 3D image, wherein the determining of said second distance comprises determining the absolute difference of the depth distance of said at least two facial points;

determining a third distance between said at least two facial points using said first distance and said second distance; and identifying said person by comparing said determined third distance to stored distances in a database, wherein each of said stored distances are associated with a person.

2. The method according to claim 1, wherein said determining of third distance between said at least two facial points comprises;

calculating the third distance using Pythagoras' theorem wherein said first distance is one side and said second distance is another side in the Pythagorean equation, and the third distance is the hypotenuse.

3. The method according to claim 1, wherein said determined at least two facial points are predetermined at least two facial points or user defined at least two facial points.

4. The method according to claim 1, wherein said identifying of said person is further based on said face recognition of the 2D image, wherein said face recognition is compared to stored face recognition data in said database, wherein each of said stored face recognition data are associated with a person.

5. The method according to claim 1, wherein said at least two facial points are any of the group: nose, left ear, right ear, left eye, right eye, the top of the head, the left cheek bone, the right cheek bone, the chin, the left corner of the mouth, the right corner of the mouth, the left eye brow or the right eye brow.

6. A mobile communication device for identifying a person, said mobile communication device having a camera unit adapted for recording a three-dimensional (3D) image of said person's face, wherein said recorded 3D image comprises two-dimensional (2D) image data and depth data, said mobile communication device further comprises:
   a processing unit for performing face recognition on the 2D image data in said recorded 3D image and further adapted to determine at least two facial points on said 3D image of said person's face, said processing unit is further adapted to;
      determining a first distance between said at least two facial points in said 2D image data;
      determining a second distance between said at least two facial points using said depth data of said recorded 3D image, wherein the determining of said second distance comprises determining the absolute difference of the depth distance of said at least two facial points; and to
      determining a third distance between said at least two facial points using said first distance and said second distance;
   a memory unit storing a database of third distances, wherein each of said stored distances are associated with a person;
   and wherein said processing unit is further adapted to identifying said person by comparing said determined third distance to said stored distances in said database.

7. The mobile communication device according to claim 6, wherein said processing unit is further adapted to, in the determining of said third distance between said at least two facial points, calculating the third distance using Pythagoras' theorem wherein said first distance is one side and said second distance is another side in the Pythagorean equation, and the third distance is the hypotenuse.

8. The mobile communication device according to claim 6, wherein said processing unit is further adapted to base the identifying of said person on said face recognition of the 2D image, wherein said face recognition is compared to stored face recognition data in said database in said memory unit, wherein each of said stored face recognition data are associated with a person.

9. A non-transitory computer readable medium with program instructions that when executed on a computer circuit of a mobile communication device causes the mobile communication device to perform the method according to claim 1.

* * * * *